(12) United States Patent
Herz et al.

(10) Patent No.: US 8,402,012 B1
(45) Date of Patent: Mar. 19, 2013

(54) SYSTEM AND METHOD FOR DETERMINING RISK OF SEARCH ENGINE RESULTS

(75) Inventors: William Samuel Herz, Hayward, CA (US); Andrew C. Fear, Campbell, CA (US)

(73) Assignee: NVIDIA Corporation, Santa Clara, CA (US)

( * ) Notice: Subject to any disclaimer, the term of this patent is extended or adjusted under 35 U.S.C. 154(b) by 547 days.

(21) Appl. No.: 11/273,902

(22) Filed: Nov. 14, 2005

(51) Int. Cl.
*G06F 17/30* (2006.01)

(52) U.S. Cl. .................. 707/708; 709/213; 709/229

(58) Field of Classification Search ............ 707/1, 3, 707/102; 709/213, 229, 202
See application file for complete search history.

(56) References Cited

U.S. PATENT DOCUMENTS

| | | | |
|---|---|---|---|
| 6,721,721 B1 * | 4/2004 | Bates et al. | 707/1 |
| 6,988,209 B1 * | 1/2006 | Balasubramaniam et al. | 726/22 |
| 7,152,164 B1 * | 12/2006 | Loukas | 713/188 |
| 7,240,102 B1 * | 7/2007 | Kouznetsov et al. | 709/220 |
| 2004/0172459 A1 * | 9/2004 | Schwalm et al. | 709/217 |
| 2007/0038637 A1 * | 2/2007 | Taneja et al. | 707/10 |
| 2007/0074125 A1 * | 3/2007 | Platt et al. | 715/760 |
| 2007/0074172 A1 * | 3/2007 | Bird et al. | 717/127 |
| 2008/0172382 A1 * | 7/2008 | Prettejohn | 707/6 |

* cited by examiner

*Primary Examiner* — Anteneh Girma (57) ABSTRACT

Embodiments of the present invention include a computer-controlled method of determining the risk of results of a search engine query before presentation to a client. In one embodiment of the invention, the method comprises accessing the results of the search engine query at a server side and scanning the results for software developed to harm a computer system, e.g., virus software, malware, etc. The method further includes determining a risk ranking associated with accessing one or more of the results and returning the results and the associated risk to a client, e.g., in a web page result display. Results exceeding a client specified threshold may be eliminated from the results display.

25 Claims, 7 Drawing Sheets

SYSTEM AND METHOD FOR DETERMINING RISK OF SEARCH ENGINE RESULTS

FIELD OF THE INVENTION

The present invention is related to the field of Internet search engines. More specifically, embodiments of the invention are directed to a system and method for determining the virus risk associated with results of a web-based search engine query by prescanning.

BACKGROUND ART

A conventional web-based search engine is a program that searches a database for specified keywords and returns a list of the results where the keywords were found. Although search engine is generally a class of data mining programs, search engines are often used to search for documents (or websites) on the World Wide Web and USENET newsgroups. Search engines are accessible over the Internet.

Typically, a search engine operates by sending out a spider to fetch as many documents as possible. Another program, called an indexer, then reads these documents and creates an index based on the words contained in each document. In response to a search query, the engine may present a web page having enumerated links to other sites and/or documents related to the query.

Although convenient for searching for relevant results related to a search topic or keywords, it is possible to receive query results from unsecured sources that contain software developed to harm a computer system, such as a virus or malware. An unsuspecting user then selecting a link having a virus located therein may infect his/her computer potentially causing damage to the computer data stored therein.

SUMMARY OF THE INVENTION

Accordingly, a system and method for determining the risk associated with search engine results would be advantageous. Embodiments of the present invention include a computer-controlled method of determining the risk associated with results of a search engine query by performing prescanning.

In one embodiment of the invention, the method comprises accessing the results of the search engine query at a server side and scanning the results for software developed to harm a computer system, e.g., virus scan and or malware scan. The method further includes determining a risk associated with accessing one or more of the results and returning the results and the associated risk to a client. Alternatively, the embodiment may also perform software processing to remove detected viruses and malware software from the results before presenting them to the user.

In one embodiment of the invention, the client is an electronic computer system. In one embodiment of the invention, a rating is assigned to each of the search results indicating the determined risk of accessing the content of the result and the rating may also indicate whether or not the result has been prescanned or not. In one embodiment of the invention, the results are pre-scanned prior to being delivered to the client such that only results that meet a threshold safety criterion are returned to the client. The client can adjust the threshold.

Embodiments of the present invention also include a system for determining risk of results of a search engine query. In one embodiment of the invention, the system includes a first input for accessing the results of the search engine query at a server side. The system further includes a scanner for scanning the results for software developed to harm a computer system. The system further includes a determiner for determining a risk associated with accessing one or more of the results and an output for returning the results and the associated risk to a client.

The prescanning activity may occur in real time as the search engine identifies the results. Alternatively, the results may be prescanned and cached ahead of time before the query is received. In one embodiment, the results may include links that have been prescanned and cached, links that are scanned on the fly in response to the query, and also may include links that have not been scanned at all.

In one embodiment of the invention, the system further includes a ranker for ranking the results according to the associated risk of the results. In another embodiment of the invention, the system further includes a data storage device for storing the associated risk of one or more of the results wherein the determiner accesses the data storage unit and determines risk associated with a subsequent query based on the stored associated risk. In one embodiment of the invention, the client reports determined risk (e.g., performs a scan on content) to the server and as a result, the server can use the risk data collected from a plurality of users to determine risk of subsequent searches. In this embodiment of the invention, the server uses a plurality of criterion (including scan reports from users) to determine an aggregate risk for particular search results.

In one embodiment of the invention, the system further includes a second input for accessing an acceptable risk level or threshold associated with the client and a second filter for filtering the results according to the acceptable risk level prior to returning the results to the client. In one embodiment of the invention, a client can select the acceptable risk level or threshold based on the desired speed and quantity of results. For example, selecting a lower risk threshold may result in slower performance of the search engine and a higher risk threshold may result in faster performance of the search engine.

In accordance with the embodiments described above, the results of the search may be displayed in a web page listing of links and each link may be associated with a displayed identifier of the associated risk of visiting that link.

BRIEF DESCRIPTION OF THE FIGURES

The accompanying drawings, which are incorporated in and form a part of this specification, illustrate embodiments of the present invention and, together with the description, serve to explain the principles of the invention.

DETAILED DESCRIPTION OF THE INVENTION

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "receiving," "accessing," "retrieving," "scanning," "filtering," "outputting," "ranking," "accessing," "processing," "removing," "allocating," "storing," "allowing" or the like, refer to actions and processes (e.g., flowcharts 200 of FIGS. 2 and 300 of FIG. 3) that may partially or totally be performed on a computer system or similar electronic computing device or processor. The computer system or similar electronic computing device manipulates and transforms data represented as physical (electronic) quantities within the computer system memories, registers or other such information storage, transmission or display devices.

Embodiments of the present invention determine risk of accessing the contents of search engine query results. In particular, embodiments of the present invention determine a risk ranking for each of the results and present the determined risk to the client along with the query results, e.g., in a web page results display. In one embodiment of the invention, the query results are scanned on the server side for malicious software such as viruses, malware, worms, adware, spyware, advertising trojans, etc. In one embodiment of the invention, the scan results may be stored in a memory for a predetermined period of time and for protection in subsequent queries (e.g., comprising one or more of the same results) can be determined from the stored results. The memory or cache can be updated depending on the perceived risk that the contents have been changed since last scanned.

In one embodiment of the invention, a client can set an acceptable risk level for search results. In one embodiment of the invention, a lower risk threshold may correspond to slower performance and fewer results than a higher risk threshold. In one embodiment of the invention, the search results are filtered such that results that exceed the client's acceptable risk are not returned to the client. In one embodiment of the invention, the results are ranked and presented to the user based on the determined risk.

In one embodiment of the invention, clients report scan results of content back to the search engine. The search engine may use the reported results received from clients to determine risk of subsequent query results. In one embodiment of the invention, the search engine determines a composite risk score by accessing a plurality of data (e.g., scan results received from one or more clients, scan results the search engine itself performed, time since the last scan, scan tools used, etc.) to determine a composite risk assessment of a particular query result.

It is appreciated that embodiments of the present invention can be implemented in conjunction with any electronic device that requests a query of a database. For example, embodiments of the present invention are well suited for portable electronic devices that may not support resident anti-virus applications such as portable computer systems, cellular phones, PDAs, gaming consoles, etc. By filtering search results prior to delivering the results to the client, even electronic devices without anti-virus applications are provided a significant level of protection. Also, by providing up-to-date virus scanning software on the server side, any client computer benefits from the virus definitions on the server even if the client virus scan software is out-dated.

Figure 1A:
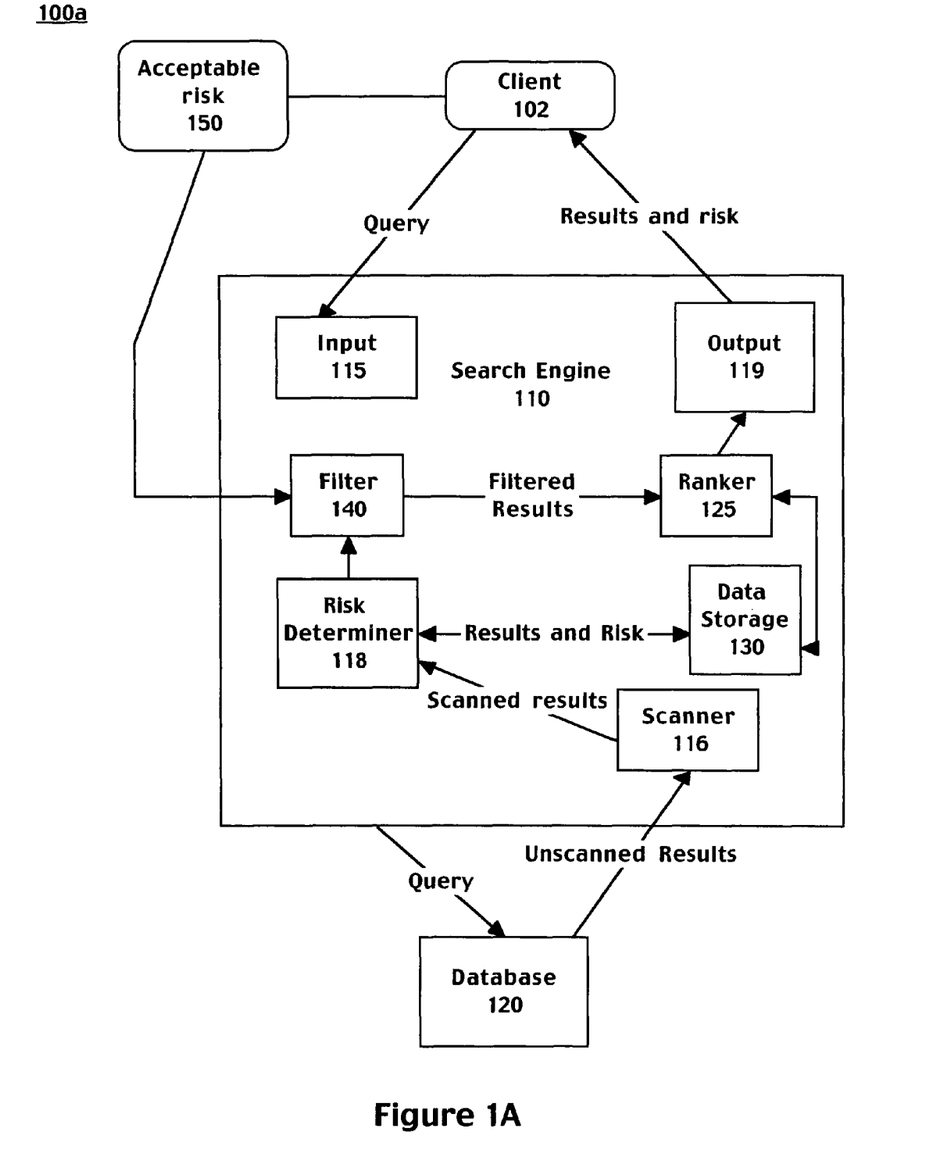
FIG. 1A is a block diagram of an exemplary system for determining risk of results of a search engine query in accordance with embodiments of the present invention.

FIG. 1 is a block diagram of an exemplary system 100a for determining risk associated with results of a search engine query. It is appreciated that embodiments of the present invention are well suited to determine risk associated with results of any query, and that the search engine implementation is only one example of such a query system on which the present invention can be implemented. In addition, it is appreciated that the embodiments of the present invention can be implemented on the client side (e.g., user side) or can be implemented on the server side (e.g., search engine side).

System 100 includes a computer system client 102 that sends a query to a search engine 110. The search engine accesses the query at an input 115. The search engine then accesses a database 120 to search for entries that meet the specifications of the query. In one embodiment of the invention, the database is a network of databases, such as the Internet. The engine 110 may be implemented as a server computer system.

The search engine 110 receives the unscanned search results and in one embodiment of the invention, a scanner 116 scans the search results for software developed to harm a computer system such as malware, viruses spyware, advertising trojans, adware, etc. In this embodiment of the invention, the scanned results are accessed by a risk determiner 118 that determines the risk of accessing the contents of the results based on identified elements of software developed to harm a computer system identified by the scanner 116.

It is appreciated that risk can be determined by any number of methods well-known in the art. For example, in one embodiment of the invention, a file size is compared to determine risk. In this embodiment of the invention, if a particular file has changed significantly since the last time checked, the risk may be determined to be higher than if the file size were the same. In another embodiment of the invention, signature analysis can be used to determine risk.

In another embodiment of the invention, the time since the last scan can be used to determine risk. In another embodiment of the invention, if a particular search result comprises a pointer or link to a site or file that is determined to be risky, the particular search result can be determined to be risky. It is appreciated that a combination of risk determiners may be used in combination to determine the risk of a particular search result.

In one embodiment of the invention, a separate risk rating is assigned to each of the results of the query. In one embodiment of the invention, a filter 140 removes the software developed to harm a computer system from the content of the results. In another embodiment of the invention, the filter 140 filters results with a risk ranking above a predetermined threshold value.

In one embodiment of the invention, the client can select the threshold risk level by specifying an acceptable risk 150. A higher acceptable risk may result in a larger number of results being returned than a lower acceptable risk level because the filter 140 will filter out more results of the query at a lower acceptable risk level. Moreover, a lower acceptable risk level may cause more periodic scanning which may lead to slower performance.

In one embodiment of the invention, the filtered results are then ranked or ordered by a ranker 125. In one embodiment of the invention, the results are ranked according to the determined risk. In this embodiment of the invention, the client receives the results of the query in a logical order according to the determined risk of accessing the contents of the results. A risk level identifier may also be displayed adjacent to the link. In one embodiment of the invention a scoring system is used to consider many different factors that contribute to risk. In this embodiment of the invention, a composite score (e.g., index) is assigned to each of the search results. In one embodiment of the invention, a user can sort the search results relative to any of the contributors to the composite score.

In one embodiment of the invention, the determined risk identifier and associated results are stored in a data storage 130 or cache. In one embodiment of the invention, the stored risk data is used to determine risk of a subsequent query result without scanning the contents of the result. In one embodiment of the invention, the risk data and associated results are stored in the data storage 130 for a predetermined period of time based on the client's acceptable risk threshold. In one embodiment of the invention, the acceptable risk 150 determines the period of time for which the risk and results are stored. The query results and the associated risk are provided to the client 102 via output 119. When cache results time-out from the cache 130, a subsequent request for those results will need to be scanned again by the scanner 116 to determine the associated risk data for those results.

In one embodiment of the invention, the client 102 may scan the search engine results and report the scan results to the search engine 110. The scan results can then be stored in the data storage 130 for use in subsequent queries. This embodiment may distribute the scanning functionality across a network group of clients which all report the risk data to the search engine 110.

It is appreciated that some results of a query may not get scanned, e.g., for performance reasons or perhaps the link is not scannable for a technical reason. In these examples, an identifier may be associated with the link identifying that the data was not scanned. A user, when selecting a risk threshold, may also select whether or not to allow unscanned results in the displayed page.

Figure 1B:
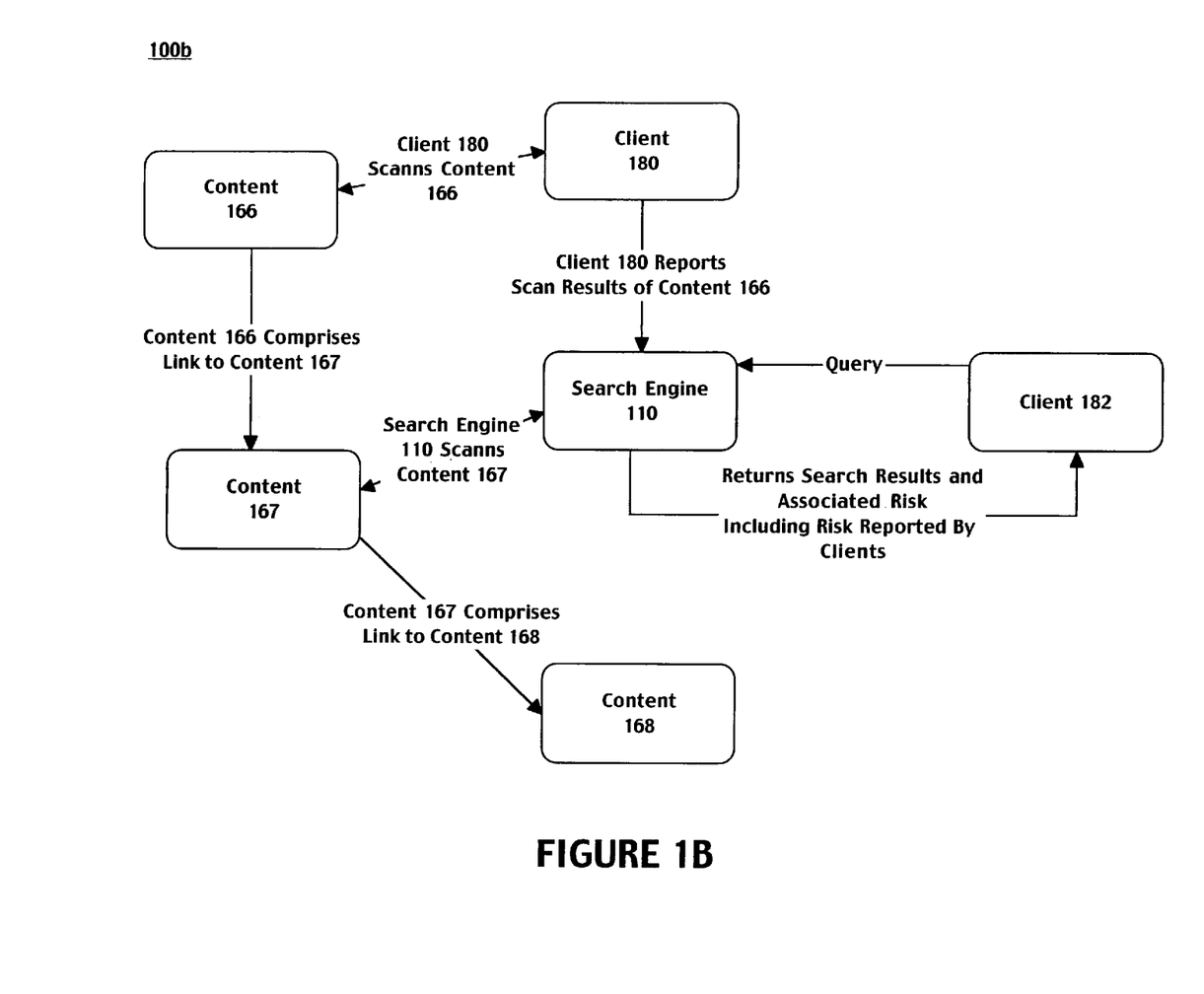
FIG. 1B is a block diagram of an exemplary network for determining risk associated with content including clients that report scan results of content to a search engine in accordance with embodiments of the present invention.

FIG. 1B is a block diagram of an exemplary network 100b for determining risk associated with content including clients that report scan results of content to a search engine 110 in accordance with embodiments of the present invention. In one embodiment of the invention, the search engine may use a composite score to determine risk of a particular query result. In this embodiment of the invention, the search engine may or may not directly scan the query result for unwanted software. For example, if client 180 reports scan results that indicate that content 166 comprises unwanted software, the search engine may assign a higher risk rating associated with content 166. Instead of relying on a single scan (e.g., at the time of reporting a query result to a client 182), the search engine can use a plurality of data to determine risk (e.g., including scan results reported by clients). In the case that a particular piece of content has been reported to have unwanted software, the search engine 110 may assign a higher risk rating to the content even if a scan performed by the search engine finds no unwanted software.

In one embodiment of the invention, if content comprises a link to other content that is known to be considered risky, then that content is also considered risky. For example, content 166 comprises a link to content 167 and content 167 comprises a link to content 168. If 167 was previously infected with a virus, the risk of both content 166 and content 168 may increase. It is appreciated that any number of heuristics for determining risk of content can be used in accordance with embodiments of the present invention. It is also appreciated that embodiments of the present invention can be used in a distributed computing environment.

Figure 2:
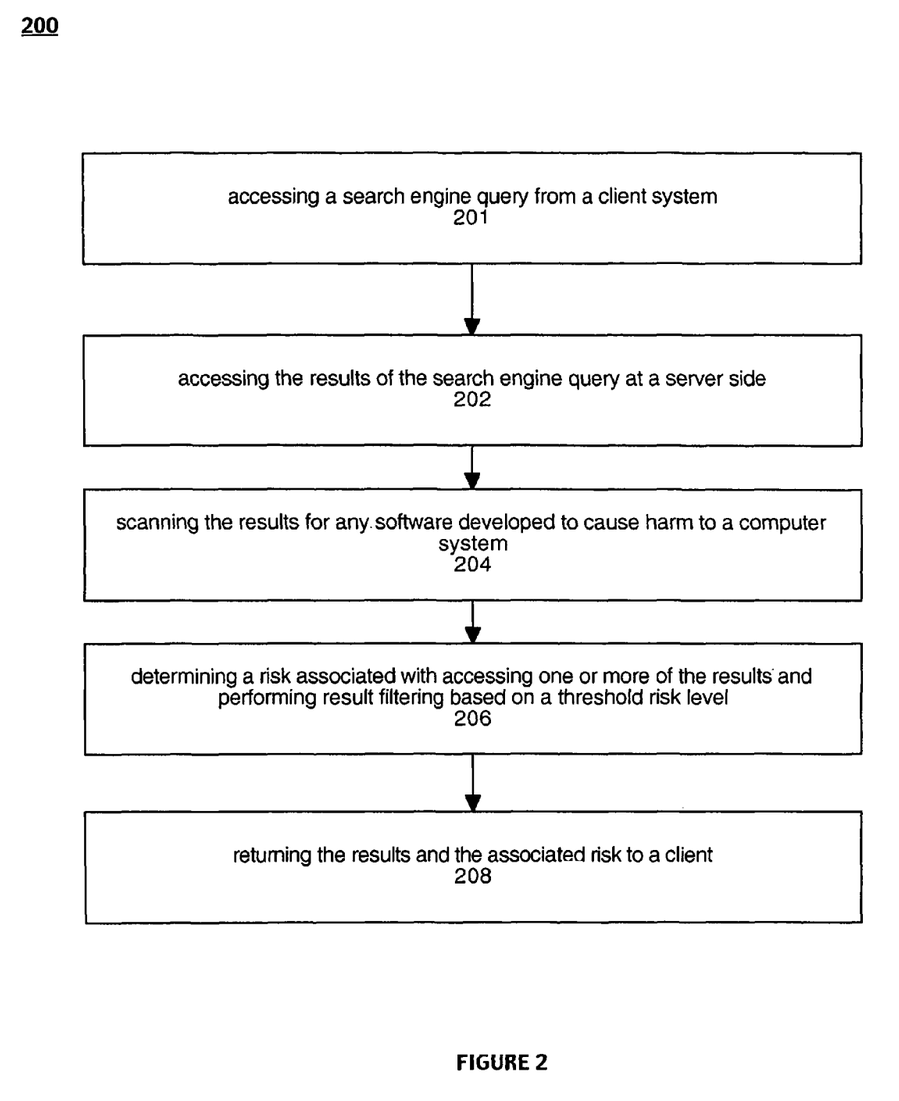
FIG. 2 is flow diagram of an exemplary computer controlled method for determining risk of results of a search engine query in accordance with embodiments of the present invention.

FIG. 2 is a flow diagram of an exemplary computer implemented method 200 of determining risk of query results and presenting risk data along with query results to a client in accordance with embodiments of the present invention. At step 201, method 200 includes accessing a search engine query from a client system. At step 202, method 200 includes accessing the results of a search engine query at a server side. In one embodiment of the invention, the search engine may be located on the server side.

At step 204, method 200 includes scanning the results of the search query for software developed to harm a computer system including viruses, malware, adware, spyware, etc. In one embodiment of the invention, the scan is performed outside the search engine, by a third party for example. The scan operation may be performed by the server system in another embodiment. The scan operation may also be distributed across a networked group of client systems, which may perform the scan and report their results to the server system. In one embodiment of the invention, step 204 includes receiving risk data from a client and using the client generated risk data to determine the current risk of the search result.

At step 206, method 200 includes determining a risk associated with accessing one or more of the search results based on the scanned results. A risk is determined for each of the query results. In one embodiment of the invention, the results are filtered prior to delivery to the client. The client can set an allowable risk level and the results can be filtered according to the acceptable risk level set by the client. In another embodiment of the invention, results comprising software developed to harm a computer system are filtered from the query results.

Also at step 206, any links that were not able to be scanned are indicated as "unscanned." These links may be filtered at step 206 depending on the client's risk threshold.

At step 208, method 200 includes returning the results and the associated risk to the client. In one embodiment of the invention, the results are ranked and presented to the user in a logical order according to the determined risk e.g., displayed in a web page format. For example, the least risky result would be presented first in order and the most risky results would be presented last in order or vice versa. Also, any links having an excess risk ranking may not be displayed at all. Links that were not scanned may also have a special designation indicating this status to the client or may be excluded from the results page all together. In one embodiment of the invention, when displayed, the search results can be organized by traditional sort criteria such as date, size, relevance, or by risk as a secondary or primary criterion.

In one embodiment of the invention, the results may be scanned at the client side and the scan results sent back to the search engine. The results of the scan on the client side can be stored by the search engine to determine the risk of subsequent queries.

Figure 3:
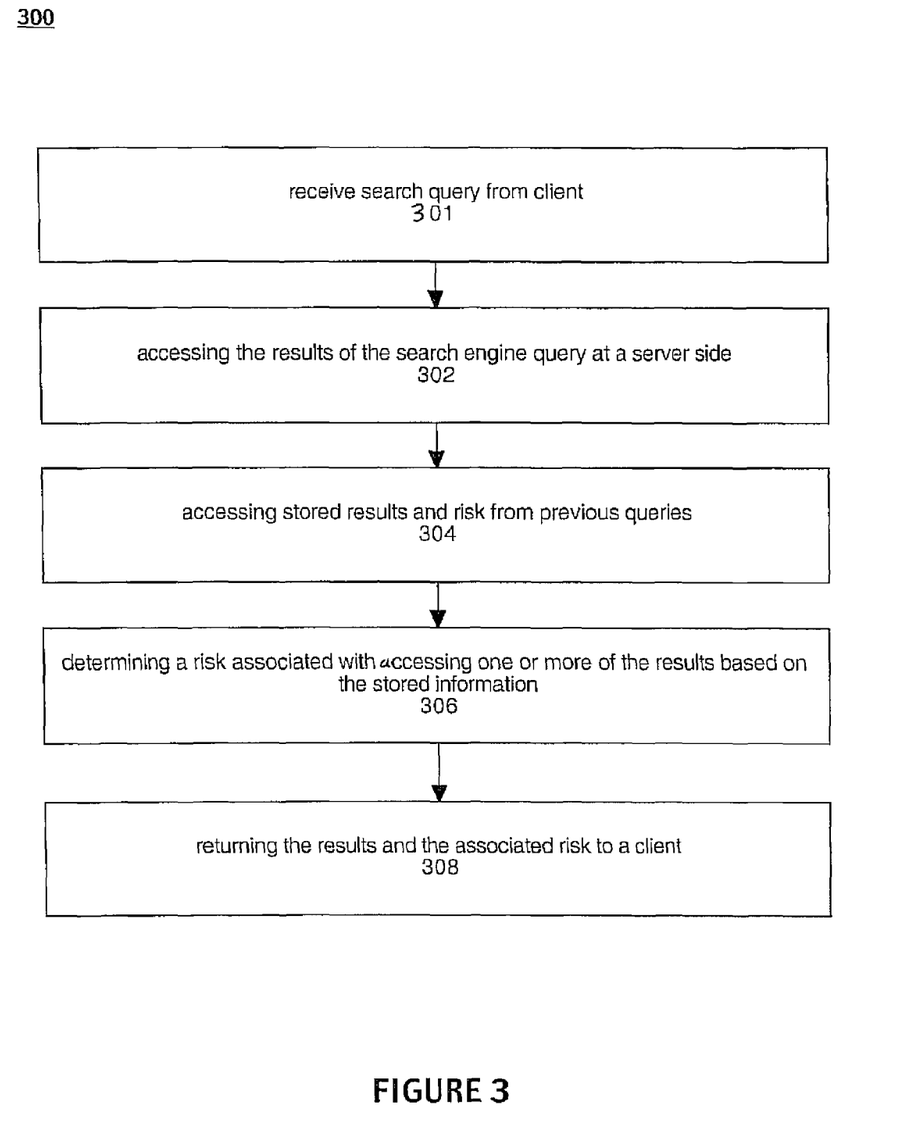
FIG. 3 is flow diagram of an exemplary computer controlled method for determining risk of results of a search engine query including accessing stored results and risk identifiers from results of previous queries in accordance with embodiments of the present invention.

FIG. 3 is a flow diagram of an exemplary computer controlled method 300 for determining risk of results of a search engine query including accessing stored results and risk from previous queries in accordance with embodiments of the present invention. As stated above, the search engine can determine risk without scanning every query result by accessing stored risk data from a previous scan that are cached.

In one embodiment of the invention, a cache of previously requested results and risk data is available. If a valid entry of the cache matches with a query result, then the risk data stored in the cache will be reported by the scanner and the results do not need to be rescanned at step 204.

At step 301, method 300 includes receiving a search query from a client. At step 302, method 300 includes accessing the results of a search engine query at a server side. In one embodiment of the invention, the search engine is on the server side.

At step 304, method 300 includes accessing stored or cached results and risk from a previous query. In one embodiment of the invention, the stored results correspond to previous times a particular query result was scanned either by the search engine or by a client that reported the results to the search engine. In one embodiment of the invention, the stored risk and results are purged after a predetermined period of time based on the client's risk threshold.

In one embodiment of the invention, the stored risk can be purged when data becomes outdated or potentially higher risk. In one embodiment of the invention, high risk results are still displayed because in some cases, high risk results are better than no results.

In one embodiment of the invention, the period of time the results and risk are stored corresponds to the acceptable risk level specified by the client. The stored risk and results can be purged in response to receiving updated risk information from a client reporting back to the search engine. In another embodiment of the invention, the stored results are updated in response to receiving information from an outside source such as a virus detection system or a notification that the contents specified by the link have been updated since the last time they were scanned. It is appreciated that results that are not located in the cache are obtained from the web and scanned to determine the risk ranking associated with the results.

At step 308, method 300 includes returning the results and the associated risk data to the client. The results can be ordered based on the risk data. In one embodiment of the invention, the results are filtered prior to sending them to the client. For example, the results comprising software developed to harm a computer system can be filtered out. In another embodiment of the invention, the results of the query are filtered according to the acceptable risk level specified by the client.

Figure 4A:
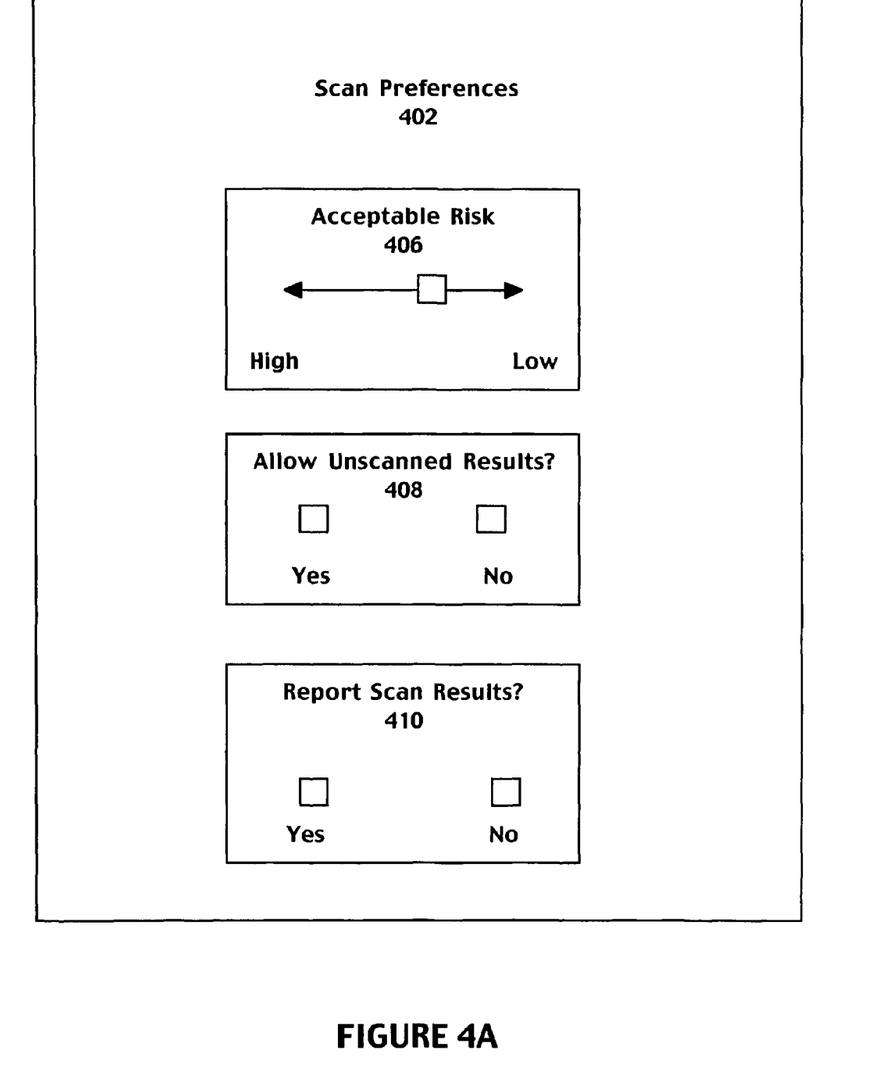
FIG. 4A is an illustration of an exemplary scan preferences user interface in accordance with embodiments of the present invention.

FIG. 4A is an illustration of an exemplary scan preferences 402 user interface in accordance with embodiments of the present invention. In one embodiment of the invention, a client can select preferences for scanning search engine query results according to many different parameters. For example, in one embodiment of the invention, a client can set an acceptable risk level 406. In one embodiment of the invention, a lower acceptable risk level 406 may result in a slower performance because the contents of the data storage 130 of FIG. 1 will be flushed more frequently and the query results will be scanned more often. In contrast, a higher acceptable risk level 406 may result in a faster performance since scan results associated with particular query results can be accessed from the data storage 130 of FIG. 1 instead of actually scanning the results. In one embodiment of the invention, a client may select to allow or disallow unscanned results 408.

In one embodiment of the invention, a client may choose to report scan results 410 back to the search engine 110 of FIG. 1. In this embodiment of the invention, a scan of search engine results can be performed on the client side and the scan results are reported back to the search engine 110 of FIG. 1. In one embodiment of the invention, the search engine 110 may update the contents of the data storage 130 according to the scan results reported by the client.

Figure 4B:
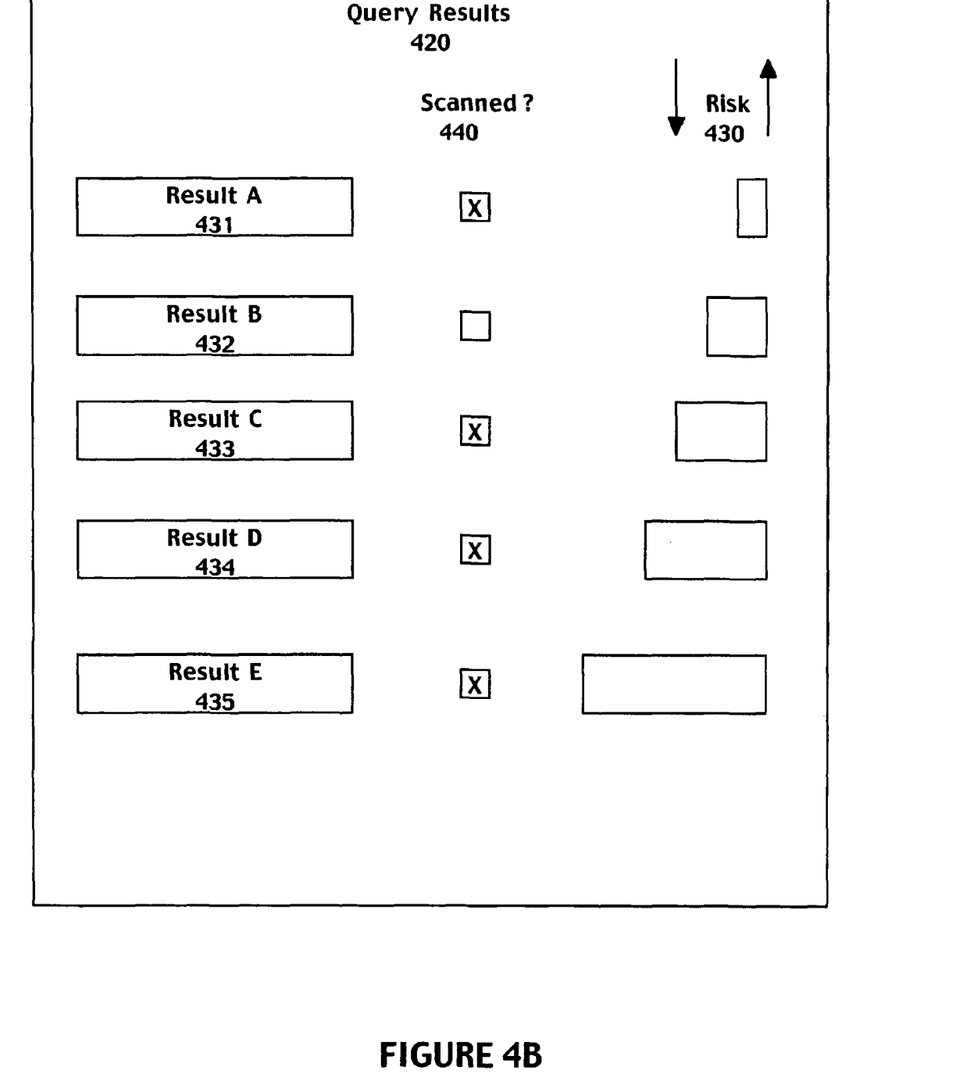
FIG. 4B is an illustration of an exemplary web page listing a plurality of search engine query results and associated risk in accordance with embodiments of the present invention.

FIG. 4B is an illustration of exemplary search engine query results 420 comprising associated risk information in accordance with embodiments of the present invention. In one embodiment of the invention, the search results 420 are sorted and displayed according to risk 430. In one embodiment of the invention, arrows can be selected to sort form the least risk to the greatest risk and vice versa. In one embodiment of the invention, the risk 430 is color coded to alert the determined risk to the client. In one embodiment of the invention, an indicator is selected to indicate if the particular search result has been scanned 440. For example, result A 431, result C 433, result D 434 and result E 435 have an X in the box next to the search result, indicating that the results have been scanned. Result B 432 has not been scanned.

Figure 5:
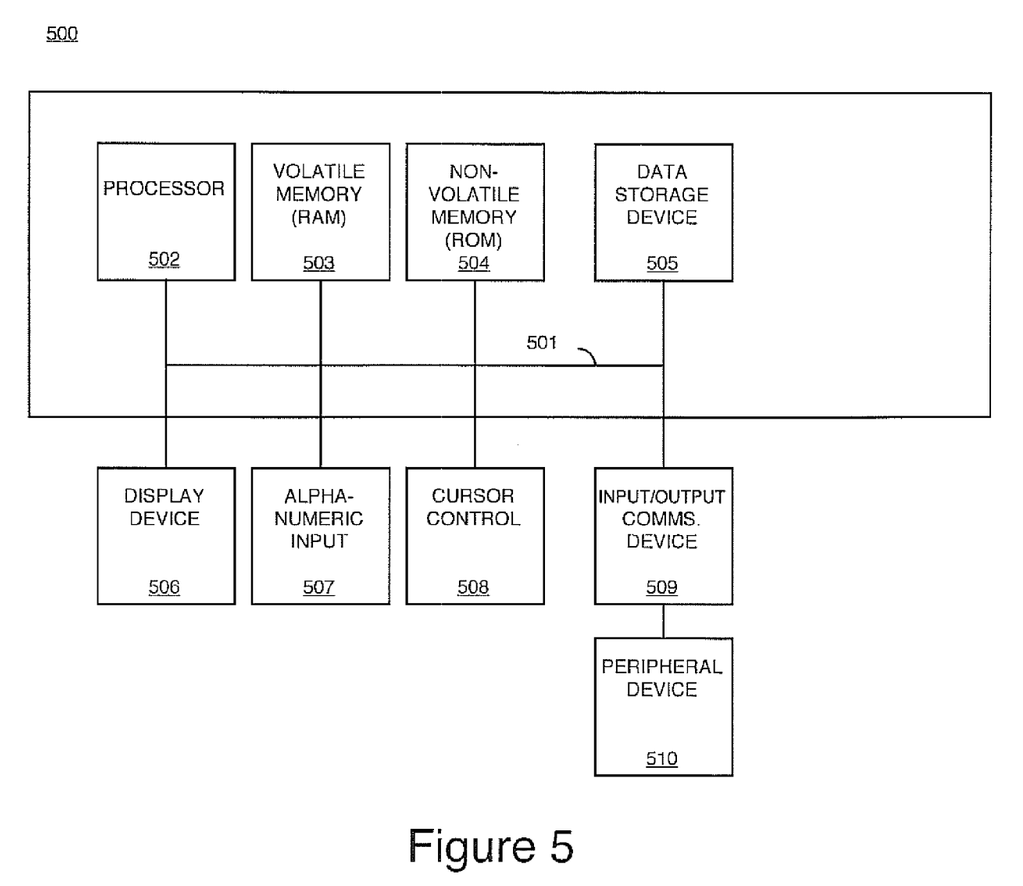
FIG. 5 is a block diagram of exemplary computer system in accordance with embodiments of the present invention.

Referring now to FIG. 5, a block diagram of exemplary computer system 500 is shown. It is appreciated that computer system 500 of FIG. 5 described herein illustrates an exemplary configuration of an operational platform upon which embodiments of the present invention can be implemented, such as the server or client systems. Nevertheless, other computer systems with differing configurations can also be used in place of computer system 500 within the scope of the present invention. For example, computer system 500 could be a search engine, a client system, or an embedded computer system such as a gaming system or audio/video system. Furthermore, computer system 500 could be a multiprocessor computer system.

Computer system 500 includes an address/data bus 501 for communicating information, a central processor 502 coupled with bus 501 for processing information and instructions, a volatile memory unit 503 (e.g., random access memory, static RAM, dynamic RAM, etc.) coupled with bus 501 for storing information and instructions for central processor 502 and a non-volatile memory unit 504 (e.g., read only memory, programmable ROM, flash memory, EPROM, EEPROM, etc.) coupled with bus 501 for storing static information and instructions for processor 502. Computer system 500 may also contain optional display devices 506 coupled to bus 501 for displaying information to the computer user. In one embodiment of the invention, display device 506 is a touch sensitive display device. Moreover, computer system 500 also includes a data storage device 505 (e.g., disk drive) for storing information and instructions.

Also included in computer system 500 of FIG. 5 is an optional alphanumeric input device 507. Device 507 can communicate information and command selections to central processor 502. Computer system 500 also includes an optional cursor control or directing device 508 coupled to bus 501 for communicating user input information and command selections to central processor 502. Computer system 500 also includes signal communication interface 509, which is also coupled to bus 501, and can be a serial port. Communication interface 509 can also include number of wireless communication mechanisms such as infrared or a Bluetooth protocol that may be optionally coupled to peripheral device 510.

Embodiments of the present invention, a system and method for determining risk of search engine query results have been described. While the present invention has been described in particular embodiments, it should be appreciated that the present invention should not be construed as limited by such embodiments, but rather construed according to the following Claims.

What is claimed is:

1. A computer controlled method of reporting results of a search engine query, said method comprising:
   accessing results of said search engine query at a server side wherein said results comprise a plurality of links;
   determining on said server side whether said results comprise software developed to harm a computer system;
   determining on said server side a respective risk data associated with accessing each of said plurality of links, wherein said respective risk data is a composite score derived from a plurality of factors, wherein said plurality of factors comprises a change in file size associated with a link of said plurality of links since a last determination of said respective risk data for said link;
   filtering on said server side said results according to an acceptable risk level associated with a client, wherein said filtering is based on a desired speed and a quantity of said results; and
   returning said results and said associated risk data to said client.

2. The method as described in claim 1 wherein said software developed to harm a computer system comprises at least one of virus software, adware software, worms, and malware software.

3. The method as described in claim 1 further comprising: ranking said results according to said respective risk data.

4. The method as described in claim 1 further comprising:
   storing said respective risk data of one or more of said links to a cache memory for a predetermined period of time, wherein a new respective risk data is determined and stored in said cache memory after said predetermined period of time is expired, and wherein said new respective risk data replaces said respective risk data; and
   wherein said determining said respective risk data comprises determining risk data of a link of said results based on cached risk data associated with said link.

5. The method as described in claim 1 further comprising:
   removing identified software developed to harm a computer system from data associated with one or more of said links of said results prior to said returning said results and said associated risk data to said client.

6. The method as described in claim 1 further comprising:
   in response to a client selecting one link of said links, removing said software developed to harm a computer system from data associated with said link prior to said client accessing said data.

7. The method as described in claim 1 further comprising:
   displaying said results and associated risk data in a web page on a display screen.

8. The method as described in claim 1, wherein said determining whether said results comprise software developed to harm said computer system comprises:
   scanning said results.

9. The method as described in claim 1, wherein said determining whether said results comprise software developed to harm said computer system comprises receiving an indication from a third party whether said results comprise software developed to harm said computer system.

10. The method as described in claim 1, wherein said determining said respective risk data comprises detecting a time elapsed since a last time said determining said respective risk data was performed.

11. A server system comprising:
    a bus;
    a processing system coupled to said bus; and
    a computer readable medium coupled to said bus comprising executable instructions which, when executed in said processing system, causes the system to perform a method of determining risk of results of a search engine query comprising:
    accessing results of said search engine query at a server side wherein said results comprise a plurality of links;
    determining on said server side whether said results software developed to harm a computer system;
    determining on said server side a respective risk data associated with accessing each of said plurality of links, wherein said respective risk data is a composite score derived from a plurality of factors, wherein said plurality of factors comprises a change in file size associated with a link of said plurality of links since a last determination of said respective risk data for said link;
    filtering on said server side said results according to an acceptable risk level associated with a client, wherein said filtering is based on a desired speed and a quantity of said results; and
    returning said results and said associated risk data to said client.

12. The server system as described in claim 11 wherein said software developed to harm a computer system comprises at least one of virus software, adware software and malware software.

13. The server system as described in claim 11 wherein said method further comprises:
    ranking said results according to said respective risk data.

14. The server system as described in claim 11 wherein said method further comprises:
    storing said respective risk data of one or more of said links to a cache memory for a predetermined period of time, wherein a new respective risk data is determined and stored in said cache memory after said predetermined period of time is expired; and
    wherein said determining said respective risk data comprises determining risk data of a link of said results based on cached risk data associated with said link.

15. The server system as described in claim 11 wherein said method further comprises:

removing identified software developed to harm a computer system from data associated with one or more of said links of said results prior to said returning said results and said associated risk data to said client.

16. The server system as described in claim 11 wherein said method further comprises:
in response to a client selecting one link of said links, removing said software developed to harm a computer system from data associated with said link prior to said client accessing said data.

17. The server system as described in claim 11 wherein said method further comprises:
displaying said results and associated risk data in a web page on a display screen.

18. A method of performing a search comprising:
accessing a search query from a client computer system;
determining results that satisfy said search query wherein said results comprise a plurality of uniform resource locators (URLs);
examining on a server side content associated with said plurality of URLs to identify software developed to harm a computer system therein;
associating on a server side risk values with said plurality of URLs based on said examining, wherein said respective risk data is a composite score derived from a plurality of factors, wherein said plurality of factors comprises a change in file size associated with a link of said plurality of links since a last determination of said respective risk data for said link;
filtering on said server side said plurality of URLs to eliminate any URLs, from said results supplied to said client computer system, that have risk values above a risk threshold level, wherein said filtering is based on a desired speed and a quantity of said results; and
supplying said client computer system with said results and said risk values.

19. A method as described in claim 18 wherein each URL of said plurality of URLs have an associated risk value associated therewith.

20. A method as described in claim 18 wherein said software developed to harm a computer system comprises at least one of virus software and spyware software.

21. A method as described in claim 18 further comprising displaying said results and said risk values on a display device of said client computer system wherein each URL of said results has an associated risk value displayed adjacent thereto.

22. A method as described in claim 18 further comprising ranking said plurality of URLs based on said risk values.

23. A method as described in claim 18 further comprising:
caching said risk values and said plurality of URLs in a cache memory for a predetermined period of time, wherein a new respective risk value is determined and stored in said cache memory after said predetermined period of time is expired.

24. A method as described in claim 23 further comprising:
receiving a risk threshold level associated with said client computer system; and
aging out contents of said cache memory based on said risk threshold level.

25. A method as described in claim 23 wherein said examining comprises obtaining risk values from said cache memory if contents of said cache memory match a URL of said results.

* * * * *